US009822462B2

(12) United States Patent
Huttner et al.

(10) Patent No.: US 9,822,462 B2
(45) Date of Patent: Nov. 21, 2017

(54) OPTICAL MEASUREMENT SYSTEM FOR DETERMINING THE POSITION OF AN ELECTRODE DURING THE ELECTROCHEMICAL PROCESSING OF A COMPONENT

(71) Applicant: MTU Aero Engines AG, Munich (DE)

(72) Inventors: Roland Huttner, Jesenwang (DE); Wilhelm Satzger, Munich (DE)

(73) Assignee: MTU AERO ENGINES AG, Munich (DE)

( * ) Notice: Subject to any disclaimer, the term of this patent is extended or adjusted under 35 U.S.C. 154(b) by 377 days.

(21) Appl. No.: 14/333,611

(22) Filed: Jul. 17, 2014

(65) Prior Publication Data
US 2015/0021199 A1 Jan. 22, 2015

(30) Foreign Application Priority Data

Jul. 19, 2013 (DE) .......... 10 2013 214 228

(51) Int. Cl.
| | |
|---|---|
| *B23H 7/26* | (2006.01) |
| *C25F 7/00* | (2006.01) |
| *C25F 3/16* | (2006.01) |
| *G01B 11/00* | (2006.01) |
| *G01S 17/46* | (2006.01) |
| *B23H 3/00* | (2006.01) |

(52) U.S. Cl.
CPC .............. *C25F 3/16* (2013.01); *B23H 7/26* (2013.01); *C25F 7/00* (2013.01); *G01B 11/002* (2013.01); *G01S 17/46* (2013.01); *B23H 3/00* (2013.01); *B23H 2500/20* (2013.01)

(58) Field of Classification Search
CPC .......... B23H 7/26; B23H 2500/20; C25F 7/00
See application file for complete search history.

(56) References Cited

U.S. PATENT DOCUMENTS

| | | | |
|---|---|---|---|
| 4,232,208 A | 11/1980 | Buehler | |
| 4,662,734 A * | 5/1987 | Nishi | ................ G03B 17/045 138/121 |
| 5,940,180 A | 8/1999 | Ostby | |
| 5,969,817 A | 10/1999 | Ohsawa | |
| 6,835,299 B1 * | 12/2004 | Tchugunov | ............. B23H 3/00 204/222 |
| 2009/0315280 A1 | 12/2009 | Dahlquist | |

(Continued)

FOREIGN PATENT DOCUMENTS

| | | |
|---|---|---|
| DE | 2826270 C2 | 9/1979 |
| DE | 4243393 A1 | 6/1994 |
| DE | 19617880 A1 | 10/1996 |

(Continued)

*Primary Examiner* — Nicholas A Smith

(74) *Attorney, Agent, or Firm* — Abel Law Group, LLP

(57) ABSTRACT

Disclosed is a device for the electrochemical processing of components, having at least one electrode and at least one electrode holder, with which the electrode is movably mounted. The device comprises at least one optical measurement system for determining the position of the electrode. Also disclosed is a method for the electrochemical processing of a component, in particular with such a device, in which the electrode is moved during the electrochemical processing, the position of the electrode being detected by means of an optical measurement system.

20 Claims, 3 Drawing Sheets

(56) References Cited

U.S. PATENT DOCUMENTS

2010/0243430 A1\* 9/2010 Yan .......................... B23H 3/00
204/192.32

FOREIGN PATENT DOCUMENTS

| DE | 19736986 A1 | | 3/1998 | |
|----|----|----|----|----|
| DE | 10122321 A1 | \* | 4/2002 | ........... G01B 11/272 |
| DE | 102011106928 A1 | | 1/2013 | |
| EP | 2181791 A2 | | 5/2010 | |

\* cited by examiner a)

b)

OPTICAL MEASUREMENT SYSTEM FOR DETERMINING THE POSITION OF AN ELECTRODE DURING THE ELECTROCHEMICAL PROCESSING OF A COMPONENT

CROSS-REFERENCE TO RELATED APPLICATIONS

The present application claims priority under 35 U.S.C. §119 of German Patent Application No. 102013214228.5, filed Jul. 19, 2013, the entire disclosure of which is expressly incorporated by reference herein.

BACKGROUND OF THE INVENTION

1. Field of the Invention

The present invention relates to a device and to a method for the electrochemical processing of components, comprising at least one electrode and at least one electrode holder, with which the electrode is movably mounted so that the electrode can be moved during the electrochemical processing.

2. Discussion of Background Information

The electrochemical processing of metallic components by electrochemical machining (ECM) of metal of the component by electrochemical micromachining (inertial confinement fusion, ICF), precise electrochemical material processing (PEM/PECM) or electropolishing is used in many industrial fields. In electrochemical processing, the material is removed by anodic oxidation in an electrochemical cell, in which the component is connected as the anode, a working electrode is connected as the cathode and a suitable electrolyte is arranged between the anode and the cathode. The dissolving of the metal depends on the current density distribution in the electrolyte and correspondingly on the distance of the electrode from the component to be processed. Consequently, contour-dependent dissolving of the metal can be achieved by a suitably shaped working electrode, so that, by electrochemical processing, exact surface shapes can be imparted to the component to be processed.

For accurate and precise processing of surfaces, either the voltage applied between the cathode and the anode may be applied in a pulsed fashion, or the electrode may be oscillated in order to vary the distance between the surface to be processed and the working electrode, so as to facilitate exchange of the electrolyte in the working gap.

In order to permit maximally exact processing of the surface of the component to be processed and, in particular, to impart the predetermined contour of the component as accurately and effectively as possible, it is necessary to further improve the electrochemical processing methods.

It would therefore be advantageous to be able to provide a device and a method for the electrochemical processing of components, which permit maximally exact and defined processing of metallic components. The corresponding device should be simply constructed and producible, and operable, and it should be possible to carry out the corresponding method in the same way.

SUMMARY OF THE INVENTION

The present invention provides a device for the electrochemical processing of a component, wherein the device comprises at least one electrode and at least one electrode holder, with which the electrode is movably mounted. The device additionally comprises at least one optical measurement system for determining the position of the electrode.

In one aspect of the device, the at least one optical measurement system may comprise a light source and a detection instrument. The light source or the detection instrument may be arranged on the electrode or the holder. The light source or the detection instrument may also be arranged on a stationary carrier. The optical measurement system further may comprise deviating optics, which deviate light from the light source with positional accuracy onto the detection instrument, the deviating optics being arranged on the holder or the electrode and the light source and the detection instrument being arranged on at least one stationary carrier. The deviating optics may comprise a retroreflector such as, e.g., a triple mirror, a triple prism or a Porro prism. The detection instrument also may comprise a PSD (position sensitive device) sensor or a CCD sensor (charge coupled device). The optical measurement instrument may comprise a laser and/or focusing optics and/or a filter instrument and/or the optical measurement instrument may comprise a protective barrier such as, e.g., a bellows and/or a sealing air system.

In another aspect of the device of the present invention, the holder and/or the optical measurement system may be configured in such a way that a two-dimensional and/or three-dimensional movement of the electrode is made possible.

The present invention also provides a method for the electrochemical processing of a component, e.g., by means of the device of the present invention as set forth above (including the various aspects thereof), in which an electrode is moved during the electrochemical processing. The method comprises detecting the position of the electrode by an optical measurement system.

In one aspect of the method, the position of the electrode may be detected constantly at least one of during, before and after the processing. In another aspect, the position of the electrode may be detected with an accuracy of at least 5 µm, e.g., with an accuracy of at least 1 µm, or with an accuracy of at least 0.5 µm.

In another aspect of the method, the electrode may be moved in oscillation.

In a still further aspect of the method, the electrochemical processing may be carried out in a pulsed fashion.

The present invention is based on the observation that, for exact electrochemical processing of metallic components, the distance of the processing electrode from the surface to be processed should be adjusted as exactly as possible. In order to allow exact adjustment of the working distance of the working electrode from the component to be processed, it is proposed to implement position measurement for determining the position of the electrode with an optical measurement system, so that exact information about the position of the electrode and therefore also about the distance of the electrode from the metal surface to be processed can be known at any time.

The use of an optical measurement system is advantageous for this since such a measurement system can be used without contact and therefore without wear, and without possible vitiating influence on the component to be measured, i.e. the position of the electrode.

In a simple embodiment, such an optical measurement system may comprise a light source and a detection instrument; a light beam is sent onto the detection instrument by the light source and the position of the incident light beam on the detection instrument can be determined by the detection instrument. If either the light source or the detection instrument is arranged on the mobile component, the position of which is intended to be determined, then the position of the mobile component with respect to the immobile component can be determined by the positionally accurate detection of the light beam.

In the present electrochemical processing, the working electrode is the mobile component, which is moved during the electrochemical processing in order to position the working electrode relative to the component to be processed before the start of the electrochemical erosion, or adjusted during the electrochemical erosion in order to shape the surface contour of the component to be processed. Furthermore, in the case of oscillating operation, the electrode may also execute oscillating movements in order to repeatedly reduce and increase the distance of the working electrode from the surface to be processed. All these movements can be monitored by an optical measurement system for determining the position of the electrode, i.e. both the initial positioning of the electrode relative to the component to be processed and the adjustment movement of the electrode during the electrochemical erosion, this process also being referred to as sinking Furthermore, an oscillation movement of the electrode during the chemical processing may be tracked and monitored.

Since the corresponding movements of the electrode are made possible by a suitable mobile holder of the electrode, a component of the optical measurement system, for example the light source or the detection instrument, may also be arranged on a corresponding holder of the electrode, so that, by means of determination of the position of the mobile holder, the position of the electrode can also be determined indirectly.

In a correspondingly simple embodiment with a light source and a detection instrument, with one of the components, i.e. the light source or the detection instrument, being arranged on the mobile component to be monitored, i.e. for example on the electrode or on the mobile electrode holder, the other component of the optical measurement system, i.e. in turn the detection instrument or the light source, may be arranged on a stationary carrier, so that the relative positioning of a mobile component of the optical measurement system, i.e. the light source or the detection instrument, can be used for position determination in relation to the stationary other component of the optical measurement system, i.e. the detection instrument or the light source.

In another embodiment, both the light source and the detection instrument may be arranged stationary on a carrier, in order to avoid the corresponding electronic component, such as the light source or the detection instrument, having to be arranged elaborately on a movable part. Furthermore, stationary mounting of the light source and of the detection instrument has the advantage that the corresponding electrical components, which may be very sensitive, are not exposed to constant movement. In this case, deviating optics may be arranged on the mobile component, the position of which is intended to be determined, for instance in the present case the working electrode or the electrode holder, which optics deviate the light beam of the light source onto the detection instrument so that the light beam initially sent by the light source onto the stationary carrier is deviated, or reflected, by the deviating optics on the mobile electrode or on the mobile electrode holder, in order subsequently to be detected on the stationary detection instrument, where the point of incidence of the light beam is again used for position determination of the mobile electrode or of the mobile electrode holder. Correspondingly, the deviating optics must cause positionally accurate reflection, or deviation, of the light beam incident from the light source to the detection instrument. To this end, a so-called retroreflector may be used, which reflects the incident light beam parallel to the incident light beam and only with a parallel offset with respect to the incident light beam. Such a retroreflector may be formed by a triple mirror, a triple prism or a Porro prism.

The detection instrument may comprise a position sensitive sensor such as a PSD (position sensitive device) sensor or a CCD (charge coupled device) sensor. With these sensors, the incidence position of the incident light beam on the sensor can be determined; the measurement signals determined may be processed and evaluated automatically in a correspondingly configured electronic data processing system.

The optical measurement instrument may comprise, as the light source, a laser which generates an exactly defined light beam. Furthermore, focusing optics, for example a focusing lens, may be used in order to focus the light beam further. A filter instrument may be provided in front of detection instrument in order to avoid undesired perturbing signals.

In order to protect the sensitive electronic equipment, such as the light source or the sensors of the detection instrument, the optical measurement instrument may be provided with a protective barrier, for example a bellows, or it is possible to arrange a sealing air system which, by generating a sealing air flow, prevents the ingress of undesired extraneous substances, for example vapors of the electrolyte, and the like.

The electrode is usually mounted in such a way that the electrode can carry out a two-dimensional movement, although three-dimensional movements, i.e. movements in three independent spatial directions, may also be possible. Overall, the movement of the electrode may comprise up to six movement degrees of freedom. Correspondingly, the optical measurement system may also be configured in such a way that it can detect a two-dimensional or three-dimensional movement of the electrode. In particular, the optical measurement system may comprise a plurality of the components described above, such as light sources and detection instruments, or a plurality of optical measurement systems may be arranged in such a way that all movements of the electrode can be detected, for example by two optical measurement systems being arranged rotated through 90° with respect to one another.

With the optical measurement system, the position of the mobile electrode can be detected constantly during and/or before and/or after the processing, in particular also in oscillating operation, i.e. when the electrode is moved in oscillation. In particular, high sampling rates of from 500 Hz to 1 kHz can be achieved by the optical measurement system, so that mechanical oscillations of the electrode in the range of from 20 to 50 Hz can be detected. The position of the electrode may in this case be determined with an accuracy of 5 µm, in particular 1 µm, and preferably 0.5 µm, movements in the range of several millimeters being detectable.

BRIEF DESCRIPTION OF THE DRAWINGS

The appended drawings show purely schematically in

FIG. 4 a representation of the optical measurement system; and in

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
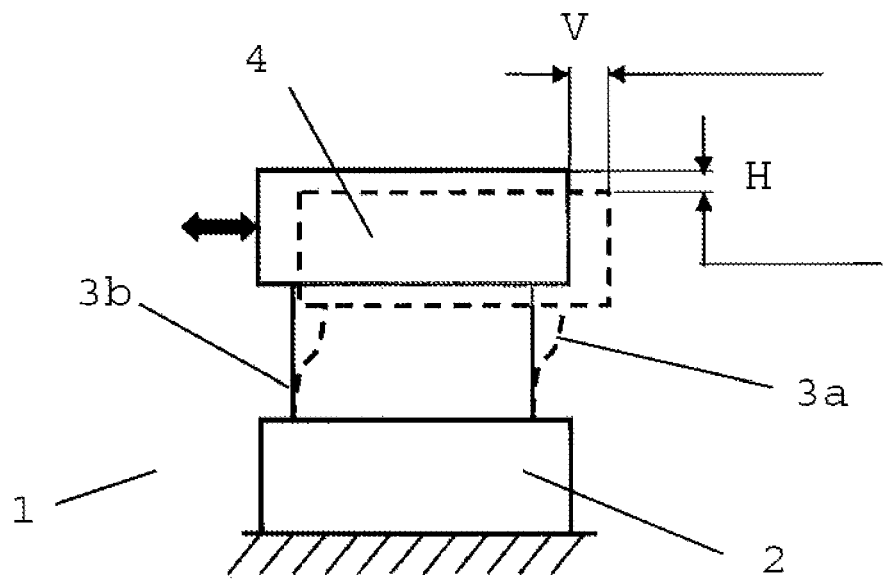
FIG. 1 a representation of an electrode holder for mobile holding of an electrode.

FIG. 1 shows a purely schematic representation of an electrode holder 1 for mobile mounting of an electrode, with a fixed base 2 and a parallel rocker 4, arranged on flexible metal plates 3a, 3b, which can move to and fro according to the double arrow, and which executes a displacement V in a first spatial direction and simultaneously causes a height change H in a spatial direction perpendicular to the first spatial direction, so that an electrode arranged on the parallel rocker 4 executes a two-dimensional movement in two independent spatial directions, as shown by the representation in dashes. Although the movement of the parallel rocker 4 is represented in FIG. 1 as a combined movement in the two independent spatial directions, a corresponding electrode holder may also be configured in such a way that the electrode holder can execute independent movements in the two independent spatial directions, so that any desired two-dimensional movements can be carried out.

Figure 2:
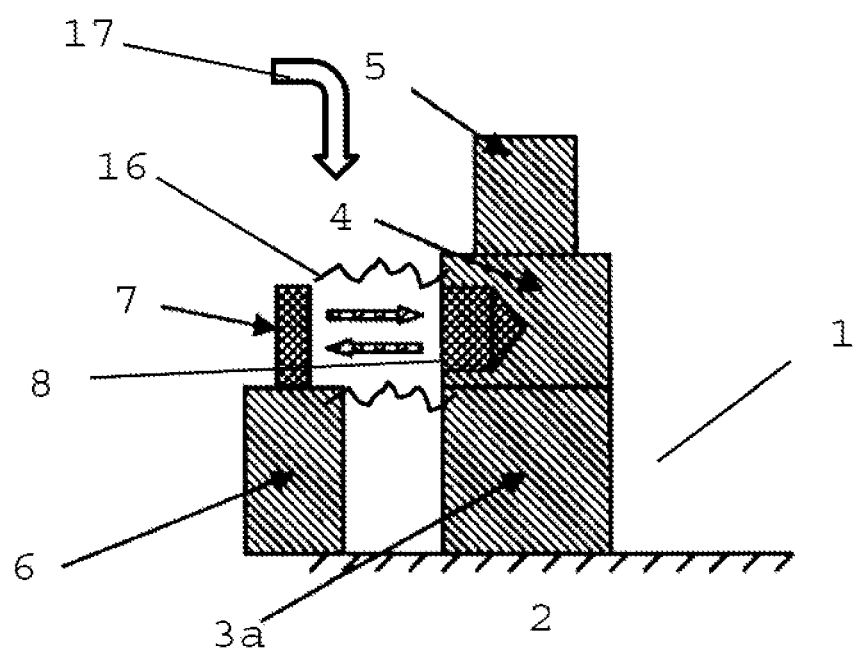
FIG. 2 a representation of an electrode holder according to the invention with an optical measurement system for position determination of the electrode.

FIG. 2 shows the electrode holder of FIG. 1 in a side view, with a processing electrode 5 and the optical measurement system according to the invention for determining the position of the processing electrode 5. The processing electrode 5 is arranged on the parallel rocker 4 and, via the mobile holder 3a, on the base 2. Separated from the mobile holder 3a and decoupled from the movement of the mobile holder 3a, a mount 6 is provided, on which a light source/detection instrument unit 7 is arranged, which interacts without contact with a triple mirror 8 that is arranged on the parallel rocker 4. The light source/detection instrument unit 7 of the optical measurement system comprises a laser, which according to the arrows in FIG. 2 emits a laser beam in the direction of the triple mirror 8, the laser beam being reflected with a parallel offset at the triple mirror 8 and detected by a sensor of the light source/detection instrument unit 7. The sensor is a position sensitive sensor, such as a so-called PSD (position sensitive device) or CCD (CCD charge coupled device) sensor. By the position sensitive sensor, it is possible to determine the position of the light beam reflected by the triple mirror 8, which in turn depends on the position of the triple mirror 8 and therefore on the position of the parallel rocker 4 and of the processing electrode 5, since the triple mirror 8 as a so-called retroreflector causes positionally accurate reflection of the laser beam emitted by the laser.

In order to avoid contamination of the optical measurement system, or of its components, a bellows 16 is provided, which seals the intermediate space between the light source, the sensors and the deviating optics. In addition or as an alternative, it is possible to set up a sealing air system with a flow of air or other suitable gases, which can prevent ingress of contaminants and impurities, delivered according to the arrow 17.

Figure 3:
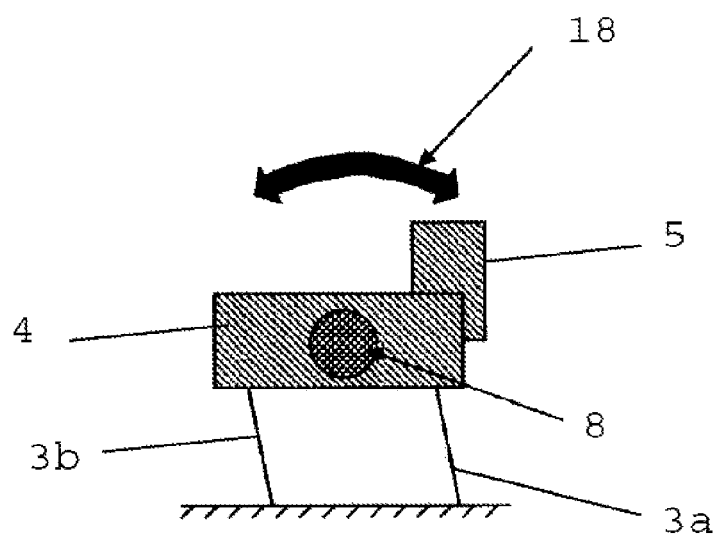
FIG. 3 a view of the electrode holder of FIG. 2 rotated through 90°.

FIG. 3 shows a view, rotated through 90°, of the electrode holder with the parallel rocker 4, the electrode 5, the triple mirror 8 in the parallel rocker 4, and the mobile holders 3a, 3b, which may for example be formed by flexible metal plates.

As indicated by the double arrow 18 of FIG. 3, the electrode 5 can be moved two-dimensionally to and fro with the parallel rocker 4 along a curved line, with the triple mirror 8 fitted in the parallel rocker 4 executing an identical movement. Since the light beam reflected by the triple mirror 8 corresponds to the position of the triple mirror, or of the parallel rocker 4, and therefore of the electrode 5, the exact location or position of the electrode 5 can be determined by determination of the position of the laser beam using a position sensitive sensor, for example a PSD or CCD sensor.

For fully automatic evaluation of the sensor signals, the sensor may be connected via a measurement amplifier and other necessary additional electronic components, in particular by conventional interfaces, for example USB interfaces, to a computer on which software suitable for the evaluation of the sensor signals is employed. By means of the electronic data processing system, corresponding measurement signals may also be stored and evaluated in respect of changes as a function of time. Long-term control of the system is therefore also possible.

Instead of only one optical measurement system 7, 8 for a mobile electrode holder 1, it is also possible to provide a plurality of optical measurement systems, or a plurality of light sources such as lasers, optical deviating units such as triple mirrors, and sensors, on an electrode holder 1, for example in order to be able to detect two-dimensional movements transversely, in particular perpendicularly, to the first two-dimensional movement by means of a second optical measurement unit. In the case of the electrode holder 1 as shown in FIG. 2, for example, a further triple mirror 8 which extends perpendicularly to the plane of the page could be provided for reflection of a laser beam, in order to be able to detect movements of the processing electrode 5 to the left or right, or up and down, in the representation of FIG. 2.

Figure 4:
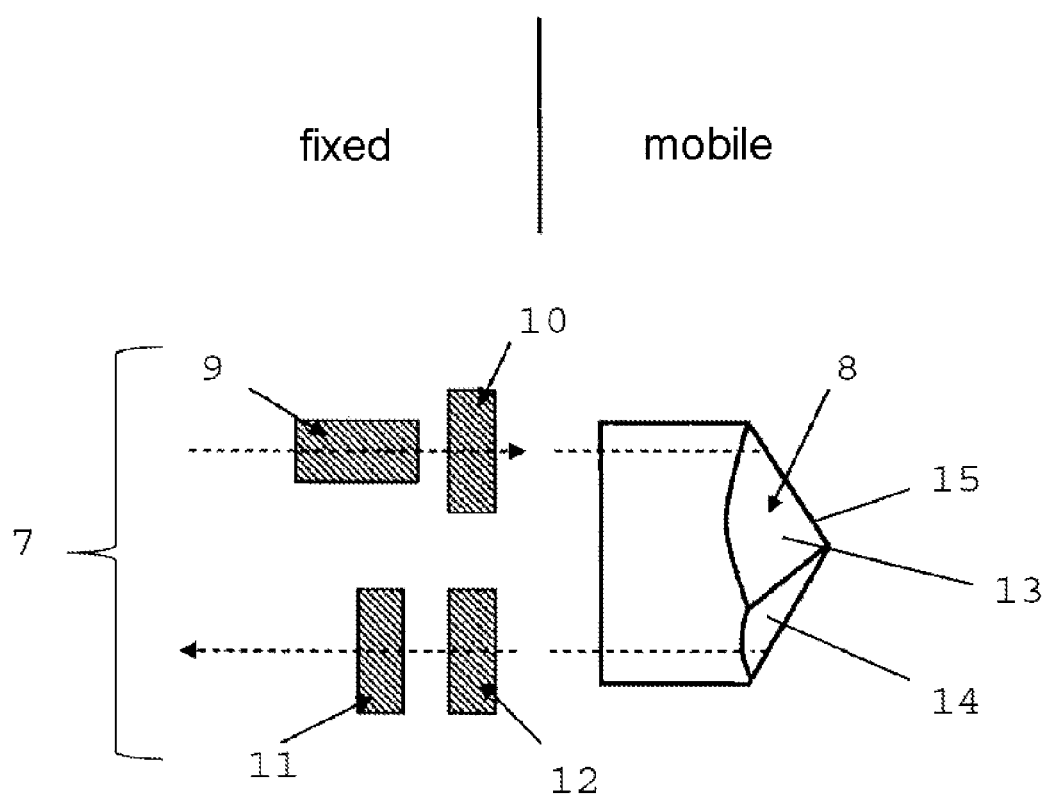

FIG. 4 illustrates the optical measurement system with the light source/detection instrument unit 7, as well as the triple mirror 8. The light source/detection instrument unit 7 comprises a laser 9, in front of which a focusing lens 10 is arranged. The focused laser beam strikes the triple mirror 8, where the laser beam is reflected with a parallel offset in order to arrive through a filter 12 on a position sensitive sensor 11, such as a PSD or CCD sensor. The filter 12 is used to suppress noise effects and to filter out perturbing light signals.

Figure 5:
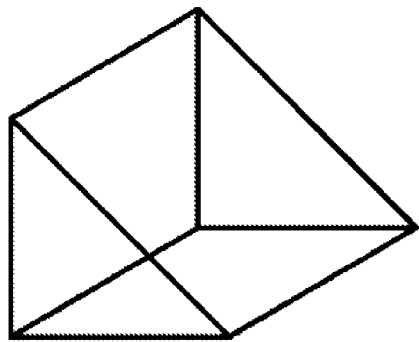
FIG. 5 in the subfigures a) and b) a representation of a triple prism and of a Porro prism.
Figure 5:
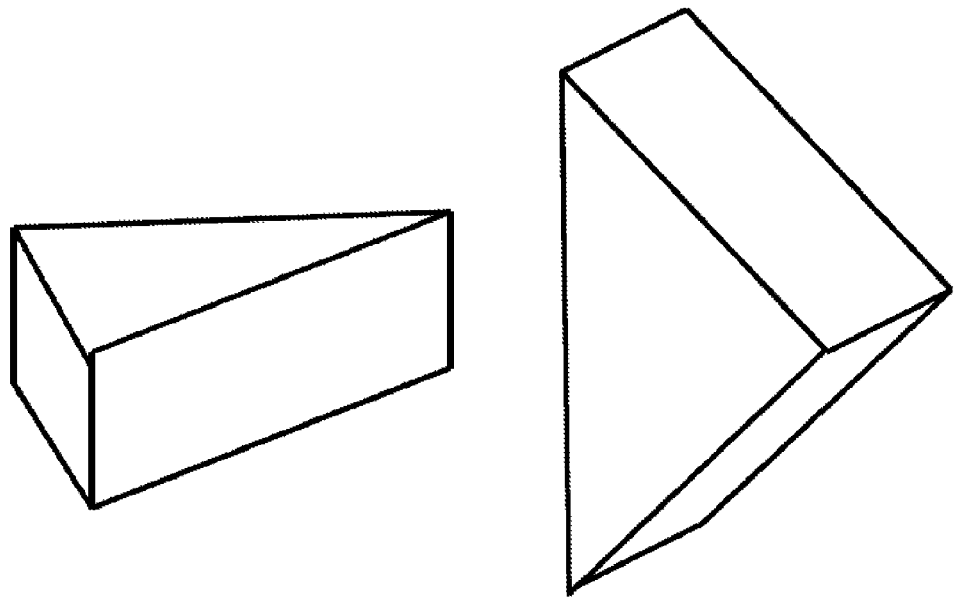

The triple mirror 8 comprises three mutually perpendicular mirror surfaces 13, 14, 15, which ensure retroreflection with a reflection beam offset parallel with respect to the incident laser beam, so that the light source in the form of the laser 9 and the sensor 11 can be arranged separately from the mobile electrode holder on a stationary mount, in order to permit contactless position determination by means of the optical measurement system. Instead of the triple mirror 8, it is also possible to use a triple prism or a Porro prism, as represented in FIG. 5 in the subfigures a) and b).

While the present invention has been described with reference to exemplary embodiments, it is understood that the words which have been used herein are words of description and illustration, rather than words of limitation.

Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for the electrochemical processing of a component, in which an electrode is moved during the electrochemical processing, wherein the method comprises detecting a position of the electrode by an optical measurement system comprising a single light source, a detection instrument, and deviation optics which deviate light from the light source with positional accuracy onto the detection instrument, the light source and the detection instrument being arranged on at least one stationary carrier and/or the deviating optics being arranged on an electrode holder or on the electrode.

2. The method of claim 1, wherein the position of the electrode is detected constantly at least one of during, before and after the processing.

3. The method of claim 1, wherein the position of the electrode is detected with an accuracy of 5 μm.

4. The method of claim 1, wherein the position of the electrode is detected with an accuracy of 1 μm.

5. The method of claim 1, wherein the position of the electrode is detected with an accuracy of 0.5 μm.

6. The method of claim 1, wherein the electrode is moved in oscillation.

7. The method of claim 1, wherein the electrochemical processing is carried out in a pulsed fashion.

8. A device for the processing of a component, wherein the device is capable of electrochemical processing of the component and comprises at least one electrode and at least one electrode holder, with which the electrode is movably mounted, as well as at least one optical measurement system for determining a position of the electrode, which optical measurement system comprises a single light source, a detection instrument, and deviation optics which deviate light from the light source with positional accuracy onto the detection instrument, the light source and the detection instrument being arranged on at least one stationary carrier and/or the deviating optics being arranged on the holder or on the electrode.

9. The device of claim 8, wherein the light source and the detection instrument are arranged on at least one stationary carrier.

10. The device of claim 8, wherein the deviating optics are arranged on the holder or the electrode.

11. The device of claim 9, wherein the deviating optics are arranged on the holder or the electrode.

12. The device of claim 8, wherein the deviating optics comprise a retroreflector.

13. The device of claim 11, wherein the deviating optics comprise a retroreflector.

14. The device of claim 8, wherein the deviating optics comprise a triple mirror, a triple prism or a Porro prism.

15. The device of claim 8, wherein the detection instrument comprises a PSD (position sensitive device) sensor or a CCD sensor (charge coupled device).

16. The device of claim 8, wherein the optical measurement instrument comprises a laser and/or focusing optics and/or a filter instrument.

17. The device of claim 8, wherein the optical measurement instrument comprises a protective barrier.

18. The device of claim 8, wherein the optical measurement instrument comprises a bellows and/or a sealing air system.

19. The device of claim 8, wherein the holder is configured in such a way that a two-dimensional and/or three-dimensional movement of the electrode is made possible.

20. The device of claim 8, wherein the optical measurement system is configured in such a way that a two-dimensional and/or three-dimensional movement of the electrode is made possible.

* * * * *